US012794037B2

(12) United States Patent
Hsiao

(10) Patent No.: US 12,794,037 B2
(45) Date of Patent: Nov. 10, 2026

(54) THERMAL INTERFACE MATERIAL COATING METHOD FOR BATTERY CELLS

(71) Applicant: T-Global Technology Co., Ltd., Taoyuan City (TW)

(72) Inventor: Ming-Hsien Hsiao, Taoyuan City (TW)

( * ) Notice: Subject to any disclaimer, the term of this patent is extended or adjusted under 35 U.S.C. 154(b) by 1069 days.

(21) Appl. No.: 17/843,871

(22) Filed: Jun. 17, 2022

(65) Prior Publication Data

US 2023/0411729 A1 Dec. 21, 2023

(51) Int. Cl.
*H01M 10/6551* (2014.01)
*B05D 1/02* (2006.01)
(Continued)

(52) U.S. Cl.
CPC .......... *H01M 10/6551* (2015.04); *B05D 1/02* (2013.01); *C08K 3/042* (2017.05); *C08K 3/045* (2017.05);
(Continued)

(58) Field of Classification Search
CPC ... H01M 10/04–0409; H01M 10/0422; H01M 10/61–617; H01M 10/62; H01M 10/625; H01M 10/64–647; H01M 10/65; H01M 10/655–6551; H01M 50/10–102; H01M 50/107; H01M 50/116; H01M 50/121–122; H01M 50/131; B05B 1/02–044; B05B 9/00–002; B05B 9/047; B05B 13/0221–0242; B05C 5/0212–022; B05C 5/0254;
(Continued)

(56) References Cited

U.S. PATENT DOCUMENTS 5,626,673 A * 5/1997 Leeds .................. B05C 5/0254 118/410
2003/0054107 A1* 3/2003 Trabold .............. B05C 11/1015 427/420

(Continued)

FOREIGN PATENT DOCUMENTS

CN 110915020 A 3/2020
CN 111653707 A 9/2020

(Continued)

OTHER PUBLICATIONS

Ding, X., et al. (2016). A review of the operating limits in slot die coating processes. AIChE Journal, vol. 62, Issue 7: 2508-2524. (Year: 2016).*

(Continued)

*Primary Examiner* — Nicole M. Buie-Hatcher
*Assistant Examiner* — Jacob Buchanan

(57) ABSTRACT

A thermal interface material coating method for battery cells is disclosed. According to the present invention, a coating system comprising a rotating mechanism, a slot die coater and a substrate is provided so as to be adopted for coating a TIM material onto at least one battery cell. Particularly, the substrate is a meshed plate including a plurality of pores. As such, in case of a coating fluid flow rate of a slit nozzle of the slot die coater, a rotation speed of the rotation mechanism, a thickness of the substrate, and a pore size of the substrate all having been properly designed, it is able to form a TIM film having a laterally-uniform thickness on the battery cell by using the coating system.

8 Claims, 9 Drawing Sheets

(51) Int. Cl.

| | |
|---|---|
| ***C08K 3/04*** | (2006.01) |
| ***C08K 3/38*** | (2006.01) |
| ***C09D 5/26*** | (2006.01) |
| ***C09D 7/61*** | (2018.01) |
| ***C09D 157/00*** | (2006.01) |
| ***C09D 187/00*** | (2006.01) |
| ***H01M 10/613*** | (2014.01) |
| ***H01M 10/615*** | (2014.01) |
| ***H01M 10/625*** | (2014.01) |
| ***H01M 10/643*** | (2014.01) |
| ***H01M 10/647*** | (2014.01) |

(52) U.S. Cl.

CPC .................. *C08K 3/38* (2013.01); *C09D 5/26* (2013.01); *C09D 7/61* (2018.01); *C09D 157/00* (2013.01); *C09D 187/00* (2013.01); *H01M 10/613* (2015.04); *H01M 10/615* (2015.04); *H01M 10/625* (2015.04); *H01M 10/643* (2015.04); *H01M 10/647* (2015.04); *C08K 2003/385* (2013.01); *C08K 2201/001* (2013.01)

(58) Field of Classification Search

CPC ......... B05C 11/021–025; B05C 11/048; B05C 13/00–025; B05D 1/00–005; B05D 1/02; B05D 1/26–28; C08K 3/042–045; C08K 3/38; C09D 5/26; C09D 7/61; C09D 157/00; C09D 187/00

See application file for complete search history.

(56) References Cited

U.S. PATENT DOCUMENTS

| | | | | |
|---|---|---|---|---|
| 2016/0104842 | A1* | 4/2016 | Takeya .................... | C30B 29/58<br>117/61 |
| 2016/0226042 | A1* | 8/2016 | Hartmann ........... | H01M 50/213 |

FOREIGN PATENT DOCUMENTS

| | | | | | |
|---|---|---|---|---|---|
| CN | 111799405 | A | | 10/2020 | |
| JP | H02195644 | A | * | 8/1990 | ............. Y02E 60/12 |
| KR | 101833913 | B1 | * | 3/2018 | ........... C09D 201/00 |
| WO | WO-2019170467 | A1 | * | 9/2019 | ........ H01M 10/0585 |

OTHER PUBLICATIONS

Machine translation of Kim, KR 101833913. Originally available Mar. 2, 2018 (Year: 2018).*

Machine translation of Shinoda, JP H02195644. Originally available Aug. 2, 1990. (Year: 1990).*

* cited by examiner

THERMAL INTERFACE MATERIAL COATING METHOD FOR BATTERY CELLS

BACKGROUND OF THE INVENTION

1. Field of the Invention

The present invention relates to the technology field of battery device of electric vehicle, and more particularly to a thermal interface material coating method for battery cells.

2. Description of the Prior Art

All-electric vehicles (EVs), also referred to as battery electric vehicles, have electric motors instead of internal combustion engines. The vehicle uses a large traction battery pack to power the electric motor and must be plugged in to a wall outlet or charging equipment, also called electric vehicle supply equipment (EVSE). As explained in more detail, electric vehicle battery (EVB) is the foregoing traction battery pack used to power the electric motor of a battery electric vehicle (BEV) or a hybrid electric vehicle (HEV), and the electric vehicle battery (EVB) typically is designed to be a battery pack comprising a plurality of battery cells and a battery management circuit. FIG. 1, FIG. 2 and FIG. 3 show three different types of battery cells. According to FIG. 1, FIG. 2 and FIG. 3, there are three main packaging forms of lithium batteries: they are cylindrical, prismatic and pouch cell packages. Each packaging has its own advantages and disadvantages.

When manufacturing a battery pack, multiple battery cells are firstly assembled to form a battery module, and then at least one battery module and a battery management circuit are integrated to form the battery pack. For example, the China patent, publication No. CN111799405A, has disclosed a battery module comprising a plurality of cylindrical battery cells. The cylindrical battery cells are arranged into a plurality of columns and a plurality of rows, and are divided into the first block, the second block and the third block. The columns include the first column and the second column. The second block is located between the first block and the third block. In the second column, the cylindrical battery cells in the second block are disposed in a horizontal line, and at least one row of cylindrical battery cells in the first block and the third block protrude out of the horizontal line. By such an arrangement, there is more spacing between the battery cells and the problems of the heat accumulation existing in the conventional battery module can be solved. It is worth mentioning that, each of the battery cells is coated with a thermal interface material (TIM) thereon before being assembled to form the battery module. Conventionally, the cylindrical battery cell is soaked in a TIM solution to form a TIM film on the sides of cylindrical battery cell. However, the formed TIM film is found to be laterally uneven in thickness.

On the other hand, the China patent, publication No. CN110915020A, has also disclosed a battery module comprising multiple prismatic battery cells. For enhancing the heat dissipation of the prismatic battery cells, each of the multiple prismatic battery cells is also coated with a thermal interface material (TIM) thereon. Furthermore, the China patent, publication No. CN111653707A, has also disclosed a battery module comprising a plurality of pouch battery cells installed in a battery shell. For enhancing the heat dissipation of the pouch battery cells, each of the battery cells is also coated with a thermal interface material (TIM)

thereon. Nowadays, slot die coater is utilized to form the TIM film on the surface of the pouch battery cell and/or the prismatic battery cell.

Slot die coater is known having a slot-die. The slot-die has a high aspect ratio outlet controlling the final delivery of the TIM fluid onto the surface of the battery cell. This results in the continuous production of a wide layer of coated TIM material on the surface of the battery cell, with adjustable width depending on the dimensions of the slot-die outlet. After coating the TIM material onto the battery cell, the battery cell subsequently proceeds with the spin process, so as to make the coated TIM film comprises a laterally uniform thickness. However, after the abovementioned TIM coating, it is inevitable to adopt a spinning process, and then the equipment cost of the slot die coater due to the spinning process increases.

According to above descriptions, it is understood that there are rooms for improvement in the conventional TIM coating method for battery cells. In view of that, the present application provides a novel thermal interface material coating method for battery cells.

SUMMARY OF THE INVENTION

One of the embodiments provides a thermal interface material (TIM) coating method for battery cells. According to another embodiment, a coating system comprising a rotating mechanism, a slot die coater and a substrate is provided for coating a TIM material onto at least one battery cell. Particularly, the substrate is a meshed plate including a plurality of pores. As such, if the coating fluid flow rate of a slit nozzle of the slot die coater, the rotation speed of the rotation mechanism, the thickness of the substrate, and the pore size of the substrate all are properly designed, a TIM film having a laterally-uniform thickness can be formed on the battery cell by using the provided coating system.

The embodiment of a thermal interface material coating method for battery cells comprises the steps of:

(1) providing a rotating mechanism and a slot die coater, and filling a thermal interface material (TIM) fluid in a reservoir of the slot die coater;

(2) securing at least one battery cell to the rotating mechanism, disposed below the slot die coater;

(3) providing a substrate comprising a plurality of pores, and disposing the substrate between the battery cell and the slot die coater;

(4) when rotating the battery cell by the rotating mechanism, operating the slot die to spray the TIM fluid onto the substrate through a slit nozzle; and (5) allowing the TIM fluid to flow and pass through the plurality of pores, and then dropping on to an outer surface of the battery cell, thereby forming a TIM film on the outer surface of the battery cell.

In another embodiment, the rotation speed of the battery cell is negative correlation to the stickiness of the TIM fluid.

In another embodiment, the substrate is an arc-shaped meshed plate comprising a curvature radius in a range between 3 mm and 50 mm.

In one embodiment, the substrate comprises a thickness in a range between 0.05 mm and 100 mm, and the pore comprises a mesh size in a range between 10 mesh and 200 mesh.

In another embodiment, the slick layer is formed on the surface of the substrate, comprising the inner surface of each pore, therefore the supplied TIM fluid is allowed to pass substrate through the pores smoothly.

In another embodiment, the battery cell is a cylindrical battery cell, and the TIM fluid comprising a thermal interface material, such as a polymer matrix and a plurality of thermally conductive filler distributed in the polymer matrix.

In another embodiment, there is a scraping member connected to an edge of the slit nozzle, and the scraping plate help distribute the TIM fluid evenly across the substrate immediately after the slit nozzle supplies the TIM fluid onto the substrate.

In another embodiment, there is a pressing plate disposed in the reservoir, and a pressurizing apparatus is adopted for supplying a pressing force to the pressing plate, so as to press down the pressing plate at a given speed, thereby controlling a fluid supplying rate of the slit nozzle. The pressurizing apparatus may be a pneumatic-type pressurizing apparatus or mechanical-type pressurizing apparatus.

In another embodiment, a heating device is connected to the reservoir for heating the TIM fluid contained in the reservoir.

In another embodiment, the thermal interface material coating method for battery cells comprises the steps of:

(1) providing a moving mechanism and a slot die coater, and filling a thermal interface material (TIM) fluid in a reservoir of the slot die coater;
(2) securing at least one battery cell on the moving mechanism, disposed below the slot die coater;
(3) providing a substrate having a plurality of pores, and disposing the substrate between the battery cell and the slot die coater;
(4) when moving the battery cell along a horizontal direction, operating the slot die coater to spray the TIM fluid onto the substrate through a slit nozzle; and
(5) allowing the TIM fluid to flow and pass through the plurality of pores, and then dropping on to an outer surface of the battery cell, thereby forming a TIM film on the outer surface of the battery cell.

In another embodiment, the battery cell is moved horizontally moved at a speed in a range between 1 cm/s and 30 cm/s.

In another embodiment, the substrate comprises a thickness in a range between 0.05 mm and 100 mm, and the pore comprises a mesh size in a range between 10 mesh and 200 mesh.

In another embodiment, the slick layer is formed on a surface of the substrate, comprising the inner surface of each said pore, therefore the supplied TIM fluid is allowed to pass the substrate through said pore smoothly.

In another embodiment, the battery cell may be a prismatic battery cell or a pouch battery cell, and the TIM fluid comprises a thermal interface material, such as a polymer matrix and a plurality of thermally conductive filler spread distributed in the polymer matrix.

In another embodiment, there is a scraping plate connected to an edge of the slit nozzle, and the scraping member spreads help distribute the TIM fluid evenly across the substrate immediately after the slit nozzle supplies the TIM fluid onto the substrate.

In another embodiment, there is a pressing plate disposed in the reservoir, and a pressurizing apparatus is adopted for supplying a pressing force to the pressing plate, so as to press down the pressing plate at a motion speed, thereby controlling a fluid supplying rate of the slit nozzle. The pressurizing apparatus may be a pneumatic-type pressurizing apparatus and or mechanical-type pressurizing apparatus.

In another embodiment, a heating device is connected to the reservoir for heating the TIM fluid contained in the reservoir.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a thermal interface material coating method according to the present invention, embodiments of the present invention will be described in detail with reference to the attached drawings hereinafter.

First Example

In an embodiment, the method utilizes a rotating mechanism, a slot die coater and an arc-shaped meshed plate to coat a thermal interface material (TIM) film on at least one battery cell. In other words, the method utilizes a TIM coating system comprising one rotating mechanism, one slot die coater and one arc-shaped meshed plate to achieve coating a TIM film on at least one battery cell.

Figure 1:
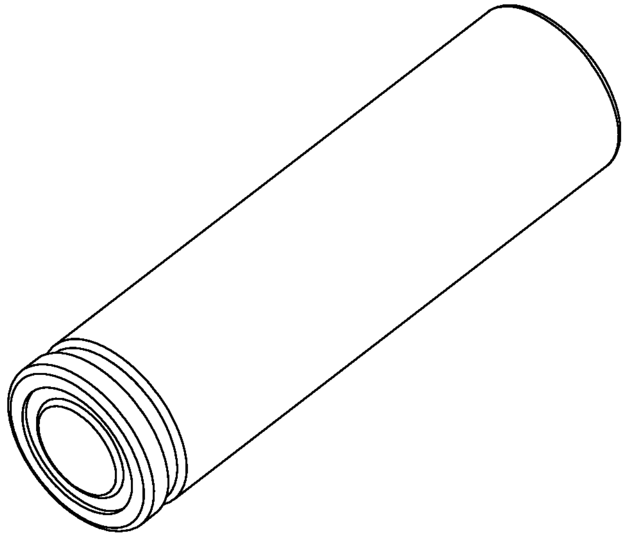
FIG. 1 (Prior art)
FIG. 1 shows a perspective view of a conventional cylindrical battery cell.
Figure 2:
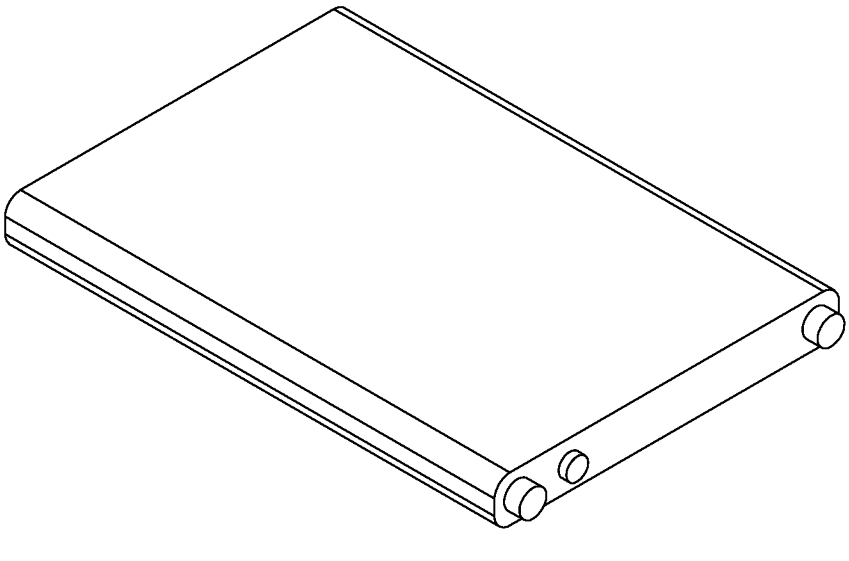
FIG. 2 (Prior art)
FIG. 2 shows a perspective view of a conventional prismatic battery cell.
Figure 3:
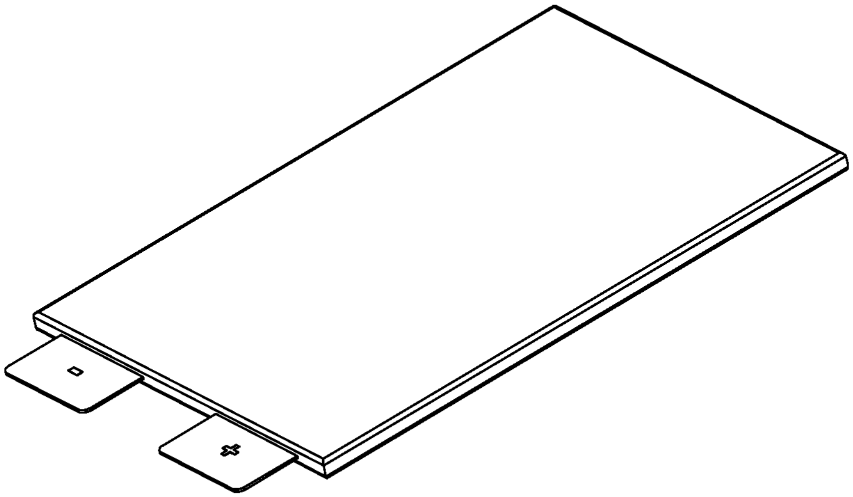
FIG. 3 (Prior art)
FIG. 3 shows a perspective view of a conventional pouch battery cell.
Figure 4:
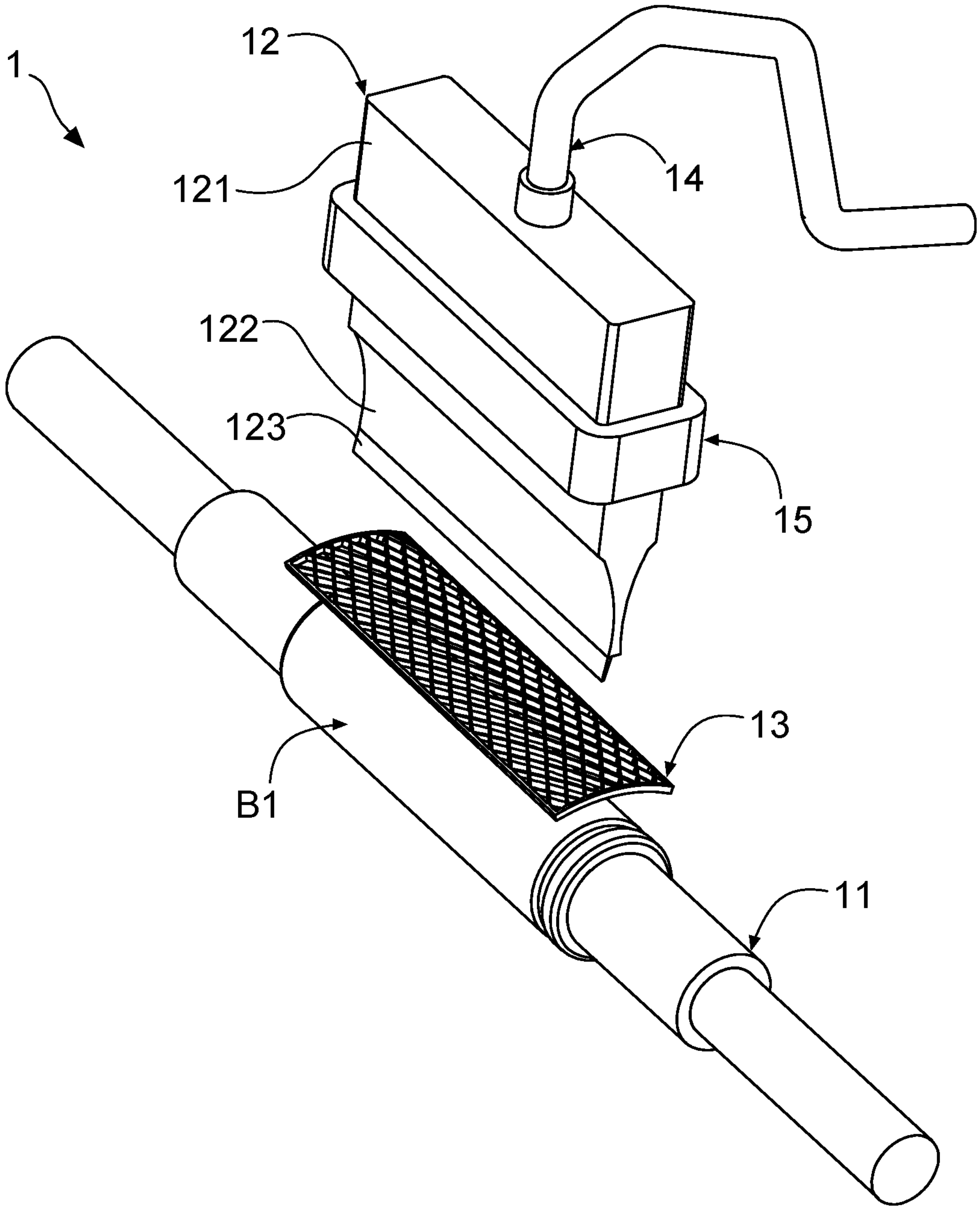
FIG. 4 shows the first perspective view of a thermal interface material coating system for battery cells according to the present invention.
Figure 5:
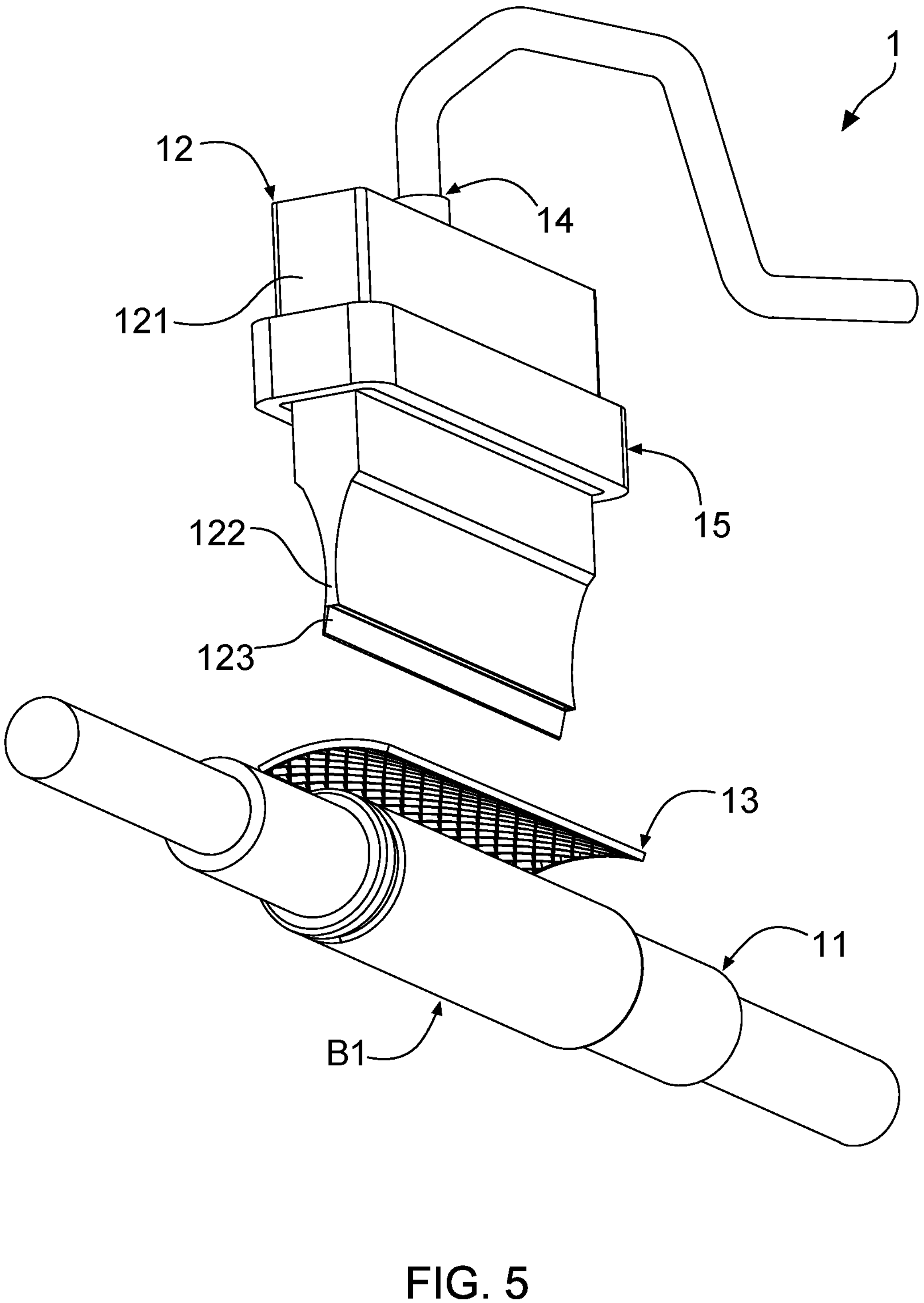
FIG. 5 shows the second perspective view of the thermal interface material coating system.
Figure 6:
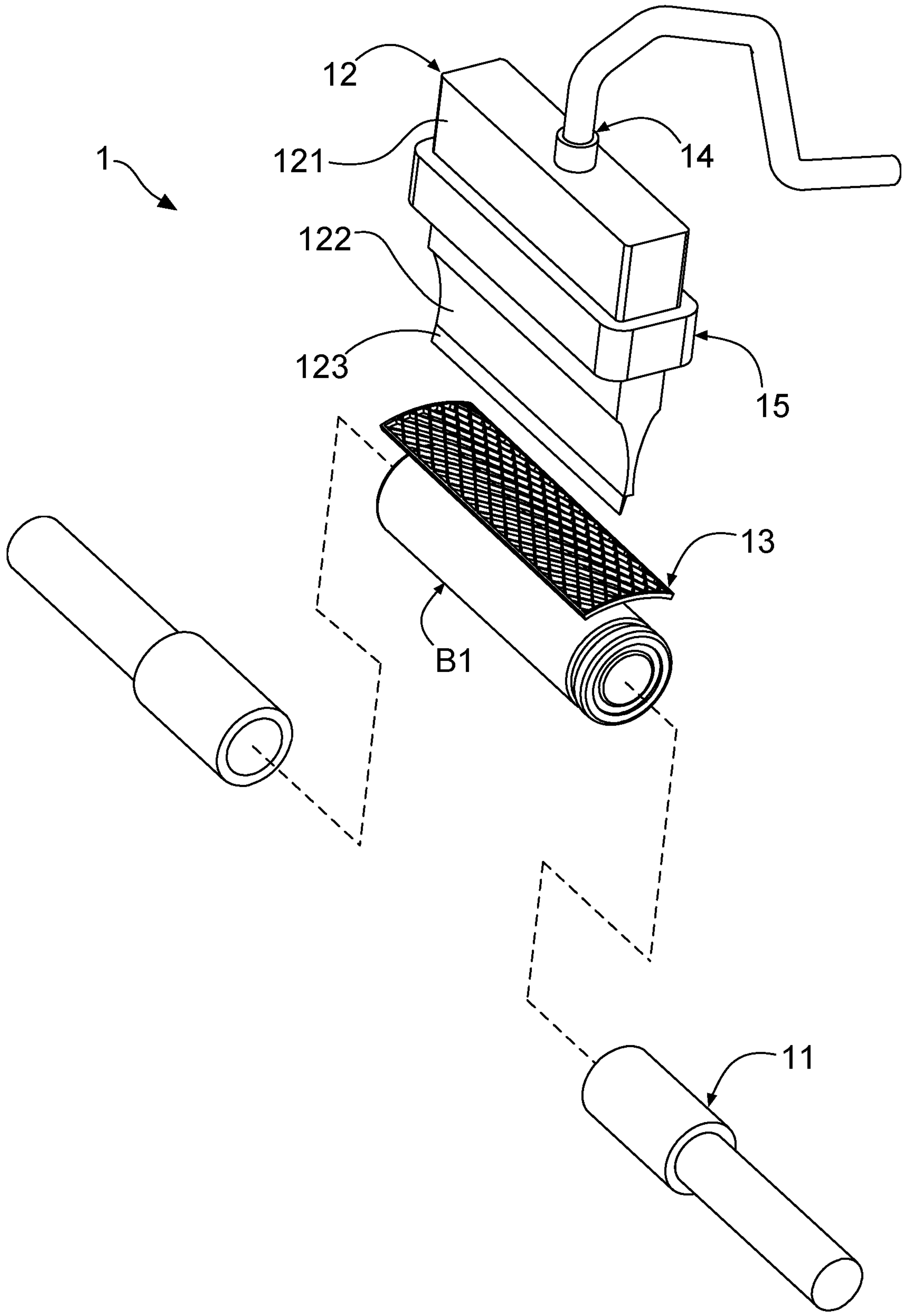
FIG. 6 shows an exploded view of the thermal interface material coating system.
Figure 7:
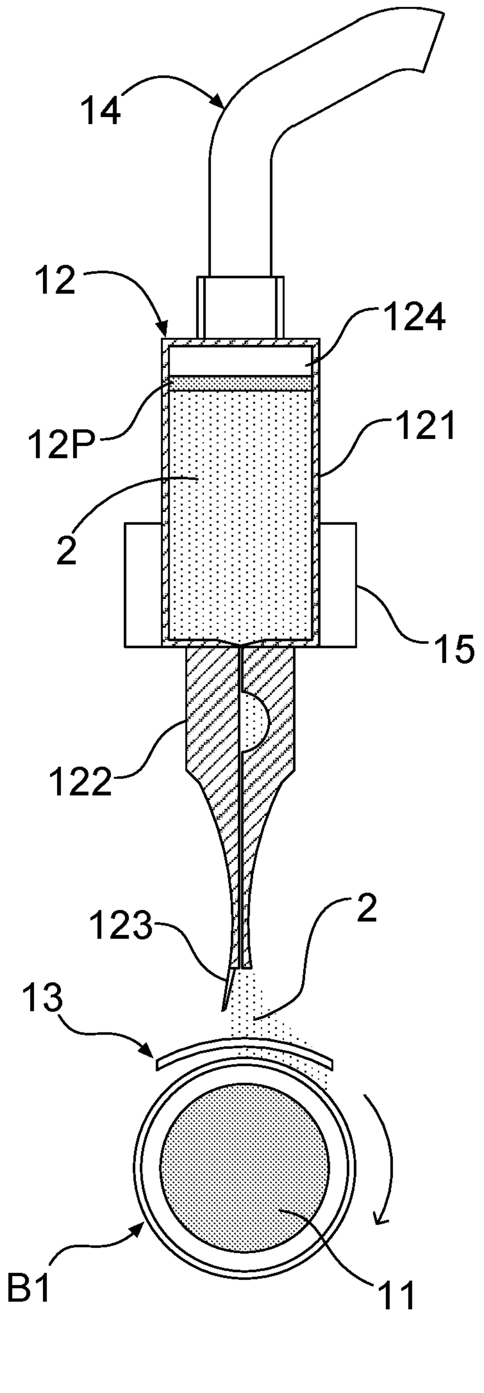
FIG. 7 shows the first sectional view of the thermal interface material coating system.

With reference to FIG. 4, there is shown the first perspective view of the thermal interface material coating system is shown for the battery cells according to the present invention. FIG. 5 shows the second perspective view of the thermal interface material coating system. FIG. 6 shows an exploded view of the thermal interface material coating system, and FIG. 7 shows the first sectional view of the thermal interface material coating system.

Figure 8:
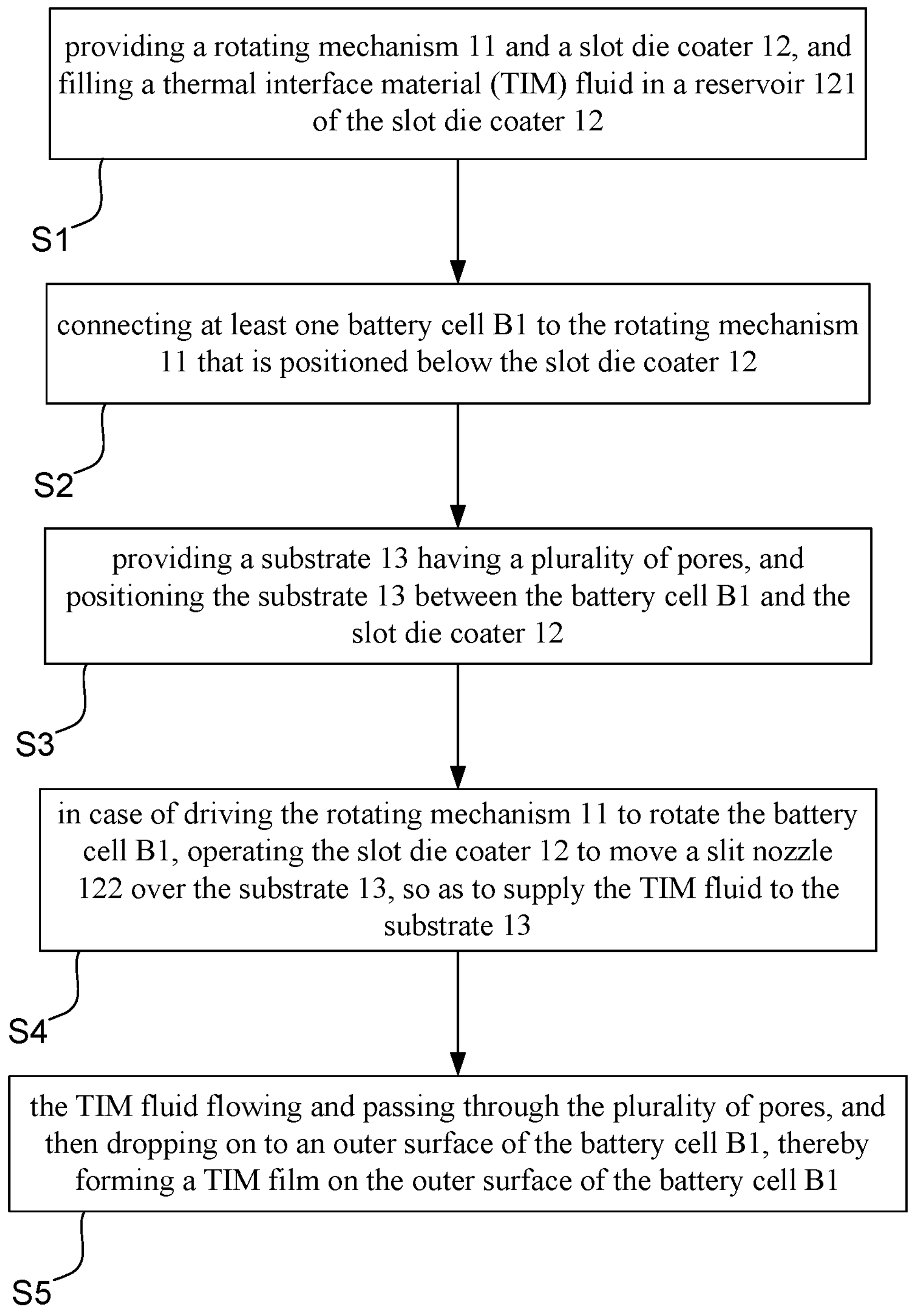
FIG. 8 shows the first flowchart of the thermal interface material coating method according to the present invention.

FIG. 8 shows the first flowchart of a thermal interface material (TIM) coating method according to the present invention. As shown in FIGS. 4-8, the TIM coating method firstly proceeds with step S1 to provide a rotating mechanism 11 and a slot die coater 12, and fill a thermal interface material (TIM) fluid in a reservoir 121 of the slot die coater 12. Then the method proceeds with step 2 for securing at least one battery cell B1 to the rotating mechanism 11, therefore the battery cell B1 is disposed below the slot die coater 12. In step S3, a substrate 13 comprising a plurality of pores is provided and disposed between the battery cell B1 and the slot die coater 12.

In another embodiment, the substrate 13 is an arc-shaped meshed plate having a curvature radius in a range between 3 mm and 50 mm. Moreover, the battery cell B1 is a cylindrical battery cell, therefore the curvature radius of the arc-shaped meshed plate (i.e., substrate 13) is designed to match the radius of the cylindrical battery cell. On the other hand, the substrate 13 comprises a thickness in a range between 0.05 mm and 100 mm, and the pore comprises a mesh size in a range between 10 mesh and 200 mesh. U.S. mesh size is defined as the number of openings in one square inch of a screen. For example, a 36 mesh comprises 36 openings per square inch while a 150 mesh comprises 150 openings per square inch.

The method subsequently proceeds with step S4. In step S4, the rotating mechanism 11 is driven to rotate the battery cell B1, and the slot die coater 12 moves the slit nozzle 122 over the substrate 13 to spray the TIM fluid onto the substrate 13. As shown in FIG. 7 shows, a scraping plate 123 is connected to an edge of the slit nozzle 122, and the scraping plate 123 helps distribute the TIM fluid evenly across the substrate 13 immediately after the slit nozzle 122 sprays the TIM fluid onto the substrate 13. Next, in step S5, the TIM fluid flows and passes through the plurality of pores, and drops onto an outer surface of the battery cell B1 to form a TIM film on the outer surface of the battery cell B1.

In order to form a TIM film having a laterally-uniform thickness on the battery cell B1, the rotating mechanism 11 is driven to rotate the battery cell B1 at a rotation speed, and the rotation speed is negative correlation to a stickiness of the TIM fluid. In other words, the higher stickiness the TIM fluid has, the slower the battery cell B1 rotates. The rotation speed of the battery cell B1 can be determined by the formula ω*R=V, where R is the radius of the battery cell B1, ω is the angular velocity of the rotating mechanism, and V is the tangent speed.

In another embodiment, a slick layer is formed on the surface of the substrate, and the inner surface of each pore is also provided with the slick layer thereon. Therefore, the TIM fluid is allowed to pass the substrate 13 through the pores smoothly. Moreover, the slick layer comprises, in weight percent, 6-68% polymer and 5-40% inorganic material. The polymer can be poly (methyl methacrylate) (PMMA), polyamide (PA), polystyrene (PS), polyethylene (PE), polypropylene (PP), polyimide (PI), polyurethane (PU), polypyrrole (PPy), polylactic acid (PLA), fluorocarbon resin, epoxy resin, or a combination of any two or more of the foregoing. On the other hand, said inorganic material can be graphite particles, boron nitride particles, carbon black, activated carbon, fullerenes, graphene, or a combination of any two or more of the foregoing.

As shown in FIGS. 4-7 show, in the case that a coating fluid flow rate of a slit nozzle of the slot die coater 12, a rotation speed of the rotation mechanism 11, a thickness of the substrate 13, and a pore size of the substrate 13 all are properly designed, it is able to use the TIM coating system to form a TIM film comprising a laterally-uniform thickness on the cylindrical battery cell B1. After cylindrical battery cells B1 is coated with the TIM film, further assembly of the cylindrical battery cells B1 can form a battery module, and then at least one battery module and a battery management circuit are integrated to form a battery pack.

TIM fluid comprises a thermal interface material such as a polymer matrix and a plurality of thermal conductive filler distributed in the polymer matrix. According to the disclosures of the China patent, publication No. CN101351755A, the thermal conductive filler can be metal oxide particles, nitride particles, carbide particles, diboride particles, graphite particles, or metal particles. In addition, it can further mix a ceramic filler into the thermal interface material, and the ceramic filler can be alumina, magnesium oxide, zinc oxide, zirconium oxide, aluminum nitride, boron nitride, or silicon nitride. Moreover, it can also further mix a carbon-based filler into the thermal interface material, and the carbon-based filler can be graphite, graphene, silicon carbide, tungsten carbide, carbon nanotubes, graphite, carbon black.

As shown in FIGS. 4-7 show, a pressing plate 12P is disposed inside the reservoir 121, and a pressurizing apparatus 124 is adopted for supplying a pressing force to the pressing plate 12P, so as to push the pressing plate 12P at a given speed, thereby controlling a fluid supplying rate of the slit nozzle 122. In another embodiment, the pressurizing apparatus 124 can be pneumatic-type pressurizing apparatus, shown in FIG. 7, or a mechanical-type pressurizing apparatus. Moreover, a heating device 15 is connected to the reservoir 121 for heating the TIM fluid contained in the reservoir 121.

Second Example

Figure 9:
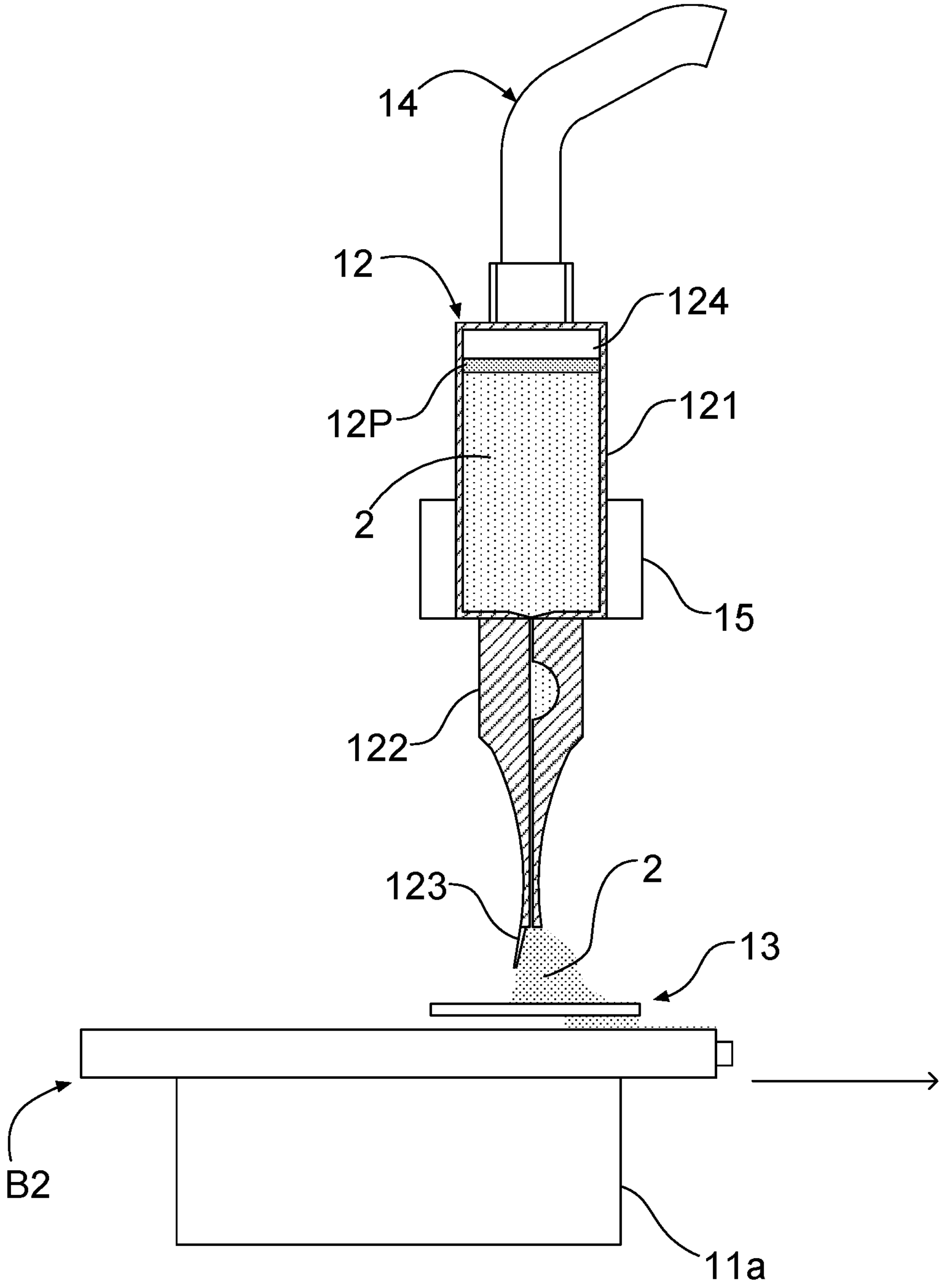
FIG. 9 shows the second cross sectional view of the thermal interface material coating system.
Figure 10:
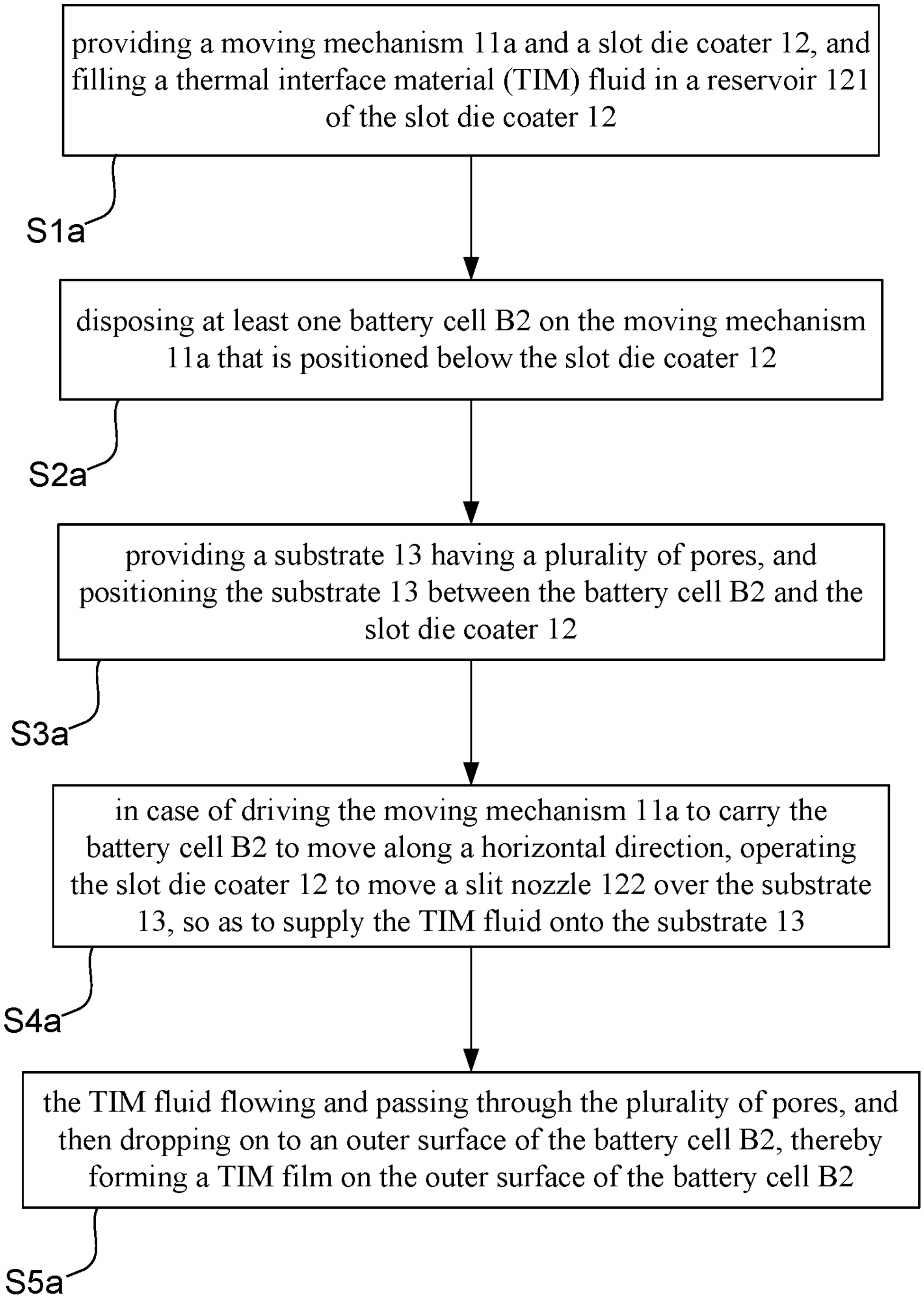
FIG. 10 shows the second flowchart of the thermal interface material coating method according to the present invention.

In another embodiment, the method utilizes a moving mechanism, a slot die coater and an arc-shaped meshed plate to coat a thermal interface material (TIM) film on at least one battery cell. In other words, the method utilizes a TIM coating system comprising one moving mechanism, one slot die coater and one arc-shaped meshed plate to achieve coating a TIM film on at least one battery cell. With reference to FIG. 9, sectional view of the thermal interface material coating system for battery cells according to the present invention is provided. FIG. 10 shows the second flowchart of the thermal interface material coating method according to the present invention.

As shown in FIG. 9 and FIG. 10, the method firstly proceeds with step S1*a* to provide a moving mechanism 11*a* and a slot die coater 12, and then to fill a thermal interface material (TIM) fluid in a reservoir 121 of the slot die coater 12. Then, the method proceeds with step S2*a* for disposing at least one battery cell B2 on the moving mechanism 11*a* that is disposed below the slot die coater 12. In step S3*a*, a substrate 13 comprising a plurality of pores is provided, and is disposed between the battery cell B2 and the slot die coater 12. The substrate 13 comprises a thickness in a range between 0.05 mm and 100 mm, and the pore has a mesh size in a range between 10 mesh and 200 mesh.

The method subsequently proceeds with step S4*a*. In step S4*a*, the moving mechanism 11*a* is driven to move battery cell B2 along a horizontal direction, and the slot die coater 12 moves a slit nozzle 122 over the substrate 13 to spray the TIM fluid onto the substrate 13. As shown in FIG. 9, a scraping plate 123 connected to an edge of the slit nozzle 122, and the scraping plate 123 helps distribute the TIM fluid evenly across the substrate 13 immediately after the slit nozzle 122 sprays the TIM fluid onto the substrate 13. In addition, there is a slick layer formed on the surface of the substrate 13, and the inner surface of each pore is also provided with the slick layer thereon. Therefore the TIM fluid is allowed to pass the substrate 13 through the pores smoothly. In step S5*a*, the TIM fluid flows and passes through the plurality of pores, and then drops onto an outer surface of the battery cell B2, so as to form a TIM film on the outer surface of the battery cell B2.

It is worth mentioning that, when the moving mechanism 11*a* t moves battery cell B2 along the horizontal direction, the battery cell B2 horizontally move at a speed in a range between 1 cm/s and 30 cm/s. As explained in more detail below, the mathematical formula Q=A*V1=V2*t*W may be used to determine a suitable motion speed for the battery cell B2 and a coating weight for the TIM fluid, where Q is the coating weight, A is a cross-sectional area of the slit nozzle 122, V1 is the fluid supplying rate of the slit nozzle 122, V2 is the motion speed, t is a thickness of the TIM film formed on the battery cell B2, and W is a coating width. Therefore, when a coating fluid flow rate of a slit nozzle of the slot die coater, a moving speed of the battery cell B2, a thickness of the substrate 13, and a pore size of the substrate 13 all are properly designed, it is able to form a TIM film having a laterally-uniform thickness on the battery cell B2 by using the coating system.

As shown in FIG. 9, the battery cell B2 can be a prismatic battery cell or a pouch battery cell. After completing the TIM coating process, multiple battery cells B2 coated with the TIM film thereon can be further assembled to form a battery module, and then at least one battery module and a battery management circuit are integrated to form a battery pack.

TIM fluid comprises a thermal interface material, such as a polymer matrix and a plurality of thermal conductive filler distributed in the polymer matrix. According to the disclosures of the China patent, publication No. CN101351755A, the thermal conductive filler can be metal oxide particles, nitride particles, carbide particles, diboride particles, graphite particles, or metal particles. In addition, it can further mix a ceramic filler into the thermal interface material, and the ceramic filler can be alumina, magnesium oxide, zinc oxide, zirconium oxide, aluminum nitride, boron nitride, or silicon nitride. Moreover, it can also further mix a carbon-based filler into the thermal interface material, and the carbon-based filler can be graphite, graphene, silicon carbide, tungsten carbide, carbon nanotubes, graphite, carbon black.

Moreover, as shown in FIG. 9, a pressing plate 12P is disposed in the reservoir 121, and a pressurizing apparatus 124 is adopted for providing a pressing force to the pressing plate 12P to push the pressing plate 12P at a motion speed, thereby controlling a fluid supplying rate of the slit nozzle 122. In another embodiment, the pressurizing apparatus 124 can be an pneumatic-type pressurizing apparatus (as shown in FIG. 9) or a mechanical-type pressurizing apparatus. Moreover, a heating device 15 is connected to the reservoir 121 for heating the TIM fluid stored in the reservoir 121.

Therefore, through the above descriptions, all embodiments of the thermal interface material coating method for battery cells according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A thermal interface material coating method for battery cells, comprising the steps of:

(1) providing a rotating mechanism and a slot die coater, and filling a thermal interface material (TIM) fluid in a reservoir inside the slot die coater;

(2) securing at least one battery cell to the rotating mechanism disposed below the slot die coater, wherein the battery cell comprises a cylinder radius;

(3) providing a substrate comprising a plurality of pores, and disposing the substrate between the battery cell and the slot die coater, wherein the substrate comprises a curvature radius, and the curvature radius is designed to match the cylinder radius;

(4) when driving the rotating mechanism to rotate the battery cell, operating the slot die coater to spray the TIM fluid onto the substrate through a slit nozzle, wherein the slit nozzle is attached to the slot die coater and communicates with the reservoir, wherein a heating device is connected to the reservoir to heat the TIM fluid inside the slot die coater; and (5) allowing the TIM fluid, heated inside the slot die coater to be sprayed through the slit nozzle, to flow and pass through the plurality of pores, and then dropping on to an outer surface of the battery cell, thereby forming a TIM film on the outer surface of the battery cell.

2. The thermal interface material coating method of claim 1, wherein a rotation speed of the battery cell is a negative correlation to a stickiness of the TIM fluid.

3. The thermal interface material coating method of claim 1, wherein a slick layer is formed on a surface of the substrate and an inner surface of each of the pore, such that the supplied TIM fluid is allowed to flow on the surface of the substrate smoothly, and being also allowed to pass through said pore smoothly.

4. The thermal interface material coating method of claim 1, wherein the substrate has a thickness in a range between 0.05 mm and 100 mm, and said pore having a mesh size in a range between 10 mesh and 200 mesh.

5. The thermal interface material coating method of claim 1, wherein the battery cell is a cylindrical battery cell, and the TIM fluid being made of a thermal interface material comprising a polymer matrix and a plurality of thermal conductive filler spread in the polymer matrix.

6. The thermal interface material coating method of claim 1, wherein a scraping plate is connected to an edge of the slit nozzle, and the scraping plate distributes the TIM fluid evenly across the substrate after the slit nozzle spreads the TIM fluid onto the substrate.

7. The thermal interface material coating method of claim 1, wherein a pressing plate is disposed in the reservoir, and a pressurizing apparatus is adopted for supplying a pressing force to the pressing plate, so as to push the pressing plate at a motion speed, thereby controlling a fluid supplying rate of the slit nozzle.

8. The thermal interface material coating method of claim 7, wherein the pressurizing apparatus comprises a pneumatic pressurizing apparatus or mechanical pressurizing apparatus.

* * * * *